(12) United States Patent
Ghiggini et al.

(10) Patent No.: US 11,163,691 B2
(45) Date of Patent: Nov. 2, 2021

(54) APPARATUS AND METHOD FOR PERFORMING ADDRESS TRANSLATION USING BUFFERED ADDRESS TRANSLATION DATA

(71) Applicant: Arm Limited, Cambridge (GB)

(72) Inventors: Stefano Ghiggini, Antibes (FR); Natalya Bondarenko, Antibes (FR); Damien Guillaume Pierre Payet, Antibes (FR); Lucas Garcia, Antibes (FR)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 16/451,384

(22) Filed: Jun. 25, 2019

(65) Prior Publication Data
US 2020/0065257 A1    Feb. 27, 2020

(30) Foreign Application Priority Data

Aug. 22, 2018  (GB) ..................................... 1813667

(51) Int. Cl.
*G06F 12/10*    (2016.01)
*G06F 12/0862*  (2016.01)
*G06F 12/1027*  (2016.01)

(52) U.S. Cl.
CPC .......... *G06F 12/10* (2013.01); *G06F 12/0862* (2013.01); *G06F 12/1027* (2013.01);
(Continued)

(58) Field of Classification Search
None
See application file for complete search history.

(56) References Cited

U.S. PATENT DOCUMENTS

| 2003/0105937 A1 | 6/2003 | Cooksey et al. |
| 2014/0149632 A1* | 5/2014 | Kannan ............... G06F 12/1027 711/3 |

(Continued)

OTHER PUBLICATIONS

Combined Search and Examination Report for GB 1813667.1 dated Feb. 22, 2019, 6 pages.
(Continued)

*Primary Examiner* — Christopher D Birkhimer
*Assistant Examiner* — Ralph A Verderamo, III
(74) *Attorney, Agent, or Firm* — Nixon & Vanderhye, P.C.

(57) ABSTRACT

Examples of the present disclosure relate to an apparatus comprising processing circuitry to perform data processing operations, storage circuitry to store data for access by the processing circuitry, address translation circuitry to maintain address translation data for translating virtual memory addresses into corresponding physical memory addresses, and prefetch circuitry. The prefetch circuitry is arranged to prefetch first data into the storage circuitry in anticipation of the first data being required for performing the data processing operations. The prefetching comprises, based on a prediction scheme, predicting a first virtual memory address associated with the first data, accessing the address translation circuitry to determine a first physical memory address corresponding to the first virtual memory address, and retrieving the first data based on the first physical memory address corresponding to the first virtual memory address. The prefetch circuitry is further arranged, based on the prediction scheme, to predict a second virtual memory address associated with second data in anticipation of the second data being prefetched, and to provide the predicted second virtual memory address to the address translation circuitry to enable the address translation circuitry to obtain
(Continued)

the address translation data for the second virtual memory address.

19 Claims, 7 Drawing Sheets

(52) U.S. Cl.
CPC .. *G06F 2212/602* (2013.01); *G06F 2212/657* (2013.01); *G06F 2212/68* (2013.01)

(56) References Cited

U.S. PATENT DOCUMENTS

| | | | | |
|---|---|---|---|---|
| 2014/0149679 A1* | 5/2014 | Rowlands | ........... | G06F 12/0862 |
| | | | | 711/137 |
| 2014/0258622 A1* | 9/2014 | Lacourba | ............ | G06F 12/0811 |
| | | | | 711/122 |
| 2014/0281352 A1* | 9/2014 | Venkatsubramanian | ..................... | |
| | | | | G06F 12/1027 |
| | | | | 711/205 |

OTHER PUBLICATIONS

Examination Report dated Nov. 23, 2020, issued in GB Application No. 1813667.1 (3 pages).

* cited by examiner

120

TLB

| VA BITS | PA BITS | PREHEATED? |
|---------|---------|------------|
| - - -   | - - -   | ✗          |
| - - -   | - - -   | ✓          |
| - - -   | - - -   | ✓          |
| - - -   | - - -   | ✗          |

FIG. 6

APPARATUS AND METHOD FOR PERFORMING ADDRESS TRANSLATION USING BUFFERED ADDRESS TRANSLATION DATA

CROSS-REFERENCE TO RELATED APPLICATIONS

This application claims priority to GB 1813667.1 filed Aug. 22, 2018, the entire contents of each of which is hereby incorporated by reference.

TECHNICAL FIELD

The present technique relates to the field of address translation in a processing apparatus.

BACKGROUND

Many data processing apparatuses include cache storage, from which data may be accessed more quickly than from a main memory. For example, recently-accessed data may be stored in the cache in expectation that it is likely to be required again in the near future. Some such apparatuses include prefetch circuitry to predict data that will be required in connection with processing operations performed by processing circuitry, and to prefetch the predicted data to the cache in advance of it being required by the processing circuitry. Processing speed is thereby improved as there is no need to wait for the predicted data to be retrieved from main memory at the time it is actually requested by the processing circuitry.

If the prefetching process is too slow, the processing flow can "catch up" with the prefetching such that the predicted data is not in the cache by the time it is required for data processing operations. This causes the data processing to be slowed, because the processing circuitry must wait for the data to be retrieved from main memory. It is therefore desirable to improve the speed and efficiency of the prefetching process, in order to improve overall processing performance.

SUMMARY

In one example configuration, there is provided an apparatus comprising:
processing circuitry to perform data processing operations;
storage circuitry to store data for access by the processing circuitry;
address translation circuitry to maintain address translation data for translating virtual memory addresses into corresponding physical memory addresses; and
prefetch circuitry to:
prefetch first data into the storage circuitry in anticipation of the first data being required for performing the data processing operations, wherein the prefetching comprises:
based on a prediction scheme, predicting a first virtual memory address associated with the first data;
accessing the address translation circuitry to determine a first physical memory address corresponding to the first virtual memory address; and
retrieving the first data based on the first physical memory address corresponding to the first virtual memory address,
based on the prediction scheme, predict a second virtual memory address associated with second data in anticipation of the second data being prefetched; and
provide the predicted second virtual memory address to the address translation circuitry to enable the address translation circuitry to obtain the address translation data for the second virtual memory address.

In a further example configuration, there is provided a method comprising:
prefetching first data into a storage in anticipation of the first data being required for performing data processing operations, wherein the prefetching comprises:
based on a prediction scheme, predicting a first virtual memory address associated with the first data;
obtaining from address translation circuitry address translation data for the first virtual memory address, the address translation data defining a translation from the first virtual memory address to a physical memory address; and
retrieving the first data based on the physical memory address,
based on the prediction scheme, predicting a second virtual memory address associated with second data in anticipation of the second data being prefetched; and
providing the predicted second virtual memory address to the address translation circuitry to enable the address translation circuitry to obtain address translation data for the second virtual memory address.

In a further example configuration, there is provided an apparatus comprising:
processing means to perform data processing operations;
storage means to store data for access by the processing means;
address translation means to maintain address translation data for translating virtual memory addresses into corresponding physical memory addresses; and
prefetch means to:
prefetch first data into the storage means in anticipation of the first data being required for performing the data processing operations, wherein the prefetching comprises:
based on a prediction scheme, predicting a first virtual memory address associated with the first data;
obtaining from the address translation means the address translation data for the first virtual memory address; and
retrieving the first data based on the physical memory address corresponding to the first virtual memory address,
based on the prediction scheme, predict a second virtual memory address associated with second data in anticipation of the second data being prefetched; and
provide the predicted second virtual memory address to the address translation means to enable the address translation circuitry to obtain the address translation data for the second virtual memory address.

BRIEF DESCRIPTION OF DRAWINGS

The present technique will be described further, by way of illustration only, with reference to examples thereof as illustrated in the accompanying drawings, in which.

FIG. 6 shows an example of entries in a translation lookaside buffer; and

DESCRIPTION OF EMBODIMENTS

Figure 1:
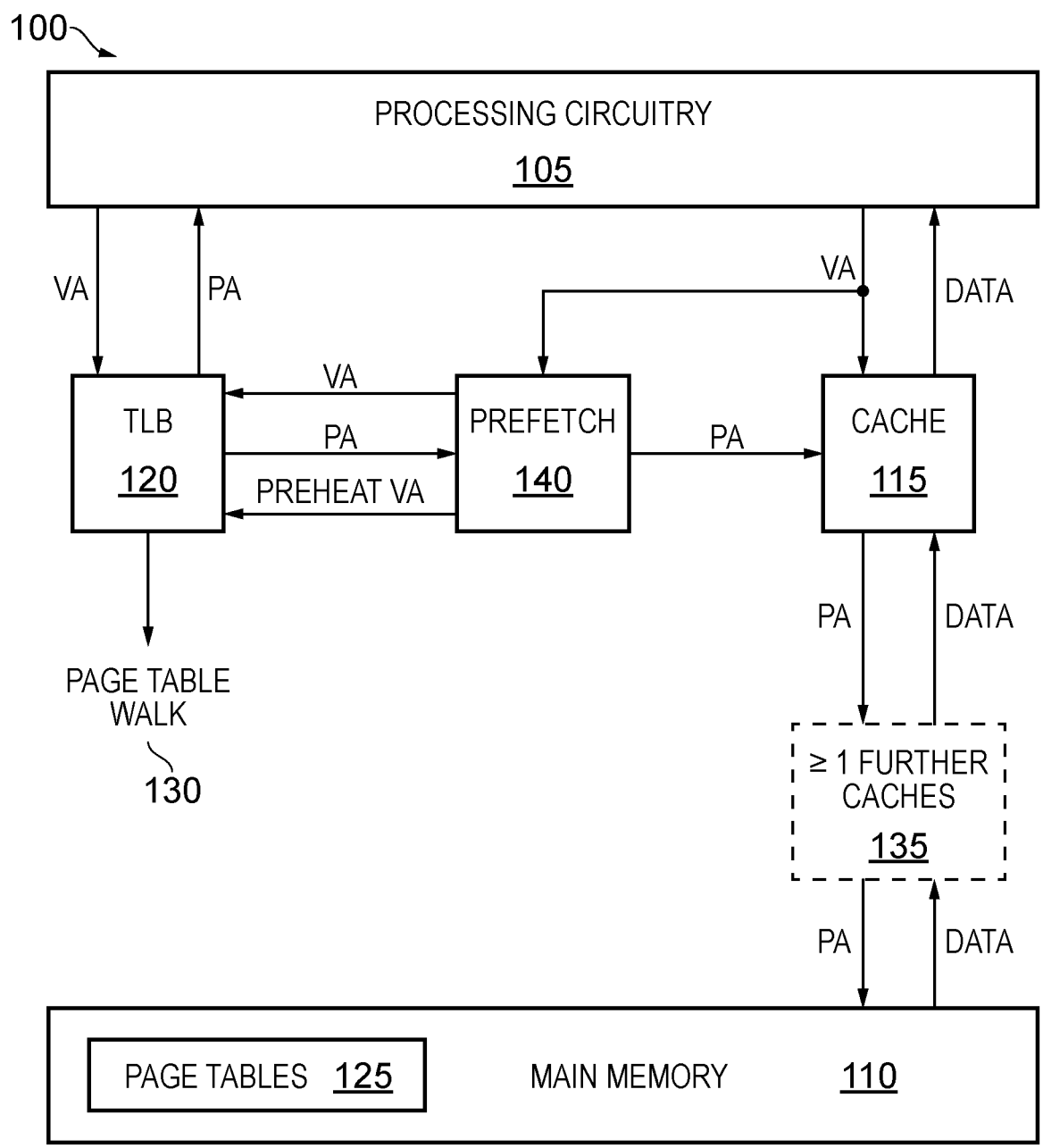
FIG. 1 shows schematically an apparatus according to one example of the present disclosure.

As noted above, some data processing apparatuses employ prefetch circuitry to prefetch first data into storage circuitry, such as a cache storage, in anticipation of the first data being required by processing circuitry for performing data processing operations. Processing circuitry may request data by way of specifying virtual memory addresses. A given virtual memory address is translated into a physical memory address in order to access the physical memory location at which the data is stored. The prefetch circuitry receives the requested virtual memory addresses and, based on this, predicts data to prefetch. For example, the prefetch circuitry may detect a pattern of requested virtual memory addresses and extrapolate this pattern into the future. An example of such a pattern is that the data processing circuitry has requested data at a sequence of regularly spaced virtual addresses.

In order to prefetch the predicted data, each predicted virtual memory address must be translated into the corresponding physical address. The process of translating a virtual memory address into a corresponding physical memory address can involve performing a "page walk" to derive address translation data for the virtual address by performing lookup operations in one or more page tables in memory. Performing a page walk is typically time-consuming, and so examples of the present disclosure include address translation circuitry to buffer address translation data obtained by the page walk process for particular pages of memory, to enable the translating of subsequently identified virtual memory addresses into corresponding physical memory addresses using the buffered address translation data where possible, thereby reducing the number of page walks required.

In an example arrangement, the address translation circuitry comprises a buffer storage to store the address translation data for a subset of virtual addresses. When translation data is requested for a given virtual address, and the translation data for the given virtual address is stored in the buffer storage, the address translation circuitry is arranged to retrieve the address translation data for the given virtual address from the buffer storage. Conversely, when translation data is requested for a given virtual address, and the translation data for the given virtual address is not stored in the buffer storage, the address translation circuitry is arranged to initiate a page table walk process to obtain the translation data for storing in the buffer storage.

For example, the address translation circuitry may implement a translation lookaside buffer to store recent virtual-to-physical address translations. Recent addresses translations can thus be retrieved without performing a page walk, thereby improving the speed of performing data processing operations.

In an example arrangement, the prefetching process comprises, based on a prediction scheme, predicting a first virtual memory address associated with first data. For example, the prediction scheme may comprise extrapolation of a prior pattern of data access by the processing circuitry. The prefetch circuitry then accesses the address translation circuitry to determine a first physical memory address corresponding to the first virtual memory address and retrieve the first data based thereon.

Based on the prediction scheme, the prefetch circuitry predicts a second virtual memory address associated with second data in anticipation of the second data being prefetched. In examples, the prefetch circuitry extrapolates the aforementioned prior pattern of data access further than the predicting of the first virtual address. For example, the predicting of the first virtual memory address may comprise extrapolating the prior pattern of data access by a first number of data processing operations ahead of a current data processing operation. The predicting of the second virtual memory address may then comprise extrapolating the prior pattern of data access by a second number of data processing operations ahead of the current data processing operation, the second number being higher than the first number. In other words, the pattern is extrapolated further into the future for the prediction of the second address than for the prediction of the first address.

The prefetch circuitry then provides the predicted second virtual memory address to the address translation circuitry to enable the address translation circuitry to obtain the address translation data for the second virtual memory address. The translation circuitry can thereby take advantage of the prediction logic of the prefetch circuitry in order to be populated with the translation data in advance of the prefetch circuitry actually prefetching the second data. This advance populating may be termed "pre-heating" of the address translation circuitry. As noted above, if given translation data is not maintained in the translation circuitry when the prefetch circuitry requests that translation data, a time-consuming page walk operation is performed in order to acquire the translation data with reference to a page table. Examples of the present disclosure allow this time-consuming page walk to be performed before the prefetch circuitry requests that translation, thereby averting the delay that would be caused by waiting for the page walk to be performed. The speed of the prefetching process is accordingly improved, reducing the chance that the data processing operations will "catch up" with the prefetching and thus improving the overall processing speed and efficiency.

In some examples, the first and second data are data items on which the data processing operations can be performed. In other examples, the first and second data are instructions to cause the processing circuitry to perform at least one of the data processing operations. Examples of the present disclosure can thus relate to a data prefetcher that prefetches data and/or an instruction prefetcher that prefetches instructions.

In some examples, the prefetch circuitry is arranged to provide the predicted second virtual memory address to the address translation circuitry responsive to a determination that the second virtual memory address is within a preheat distance of the end of a memory page. This is advantageous in examples in which the address translation circuitry is configured to store translation data for whole memory pages. In such examples, efficiency can be improved by not providing the second predicted memory address to the translation circuitry unless it lies near the end of a memory page such that it is likely that a new memory page is soon to be required to be stored in the translation circuitry. In particular, prior to that point being reached it is likely that the address translation circuitry will already have the required address translation data for the second virtual memory address due to it relating to the same memory page as the first virtual memory address.

In some examples, the apparatus comprises additional translation request source circuitry to reference the address translation circuitry to determine physical memory addresses for virtual memory addresses. The additional translation request circuitry may for example comprise further prefetch circuitry associated with further storage circuitry. The address translation circuitry can thus be shared between multiple sources of translation requests, such as prefetchers. In such situations, the above described technique allows use to be made of the prediction logic in the prefetchers in order to seek to preheat the address translation circuitry with address translation data that is likely to be needed, without having to implement complex prediction logic in the address translation circuitry. The speed and efficiency of operation of the address translation circuitry is thereby greatly improved relative to comparative systems that do not implement the pre-heating described herein, and also relative to comparative systems in which the translation circuitry itself performs the prediction: in such systems, the translation circuitry must either implement complex prediction schemes to seek to handle predictions taking into account the multiple different sources of translation requests, or it must implement simplified (and therefore less effective) prediction logic. The present disclosure allows the translation circuitry to efficiently take advantage of the prediction logic of each prefetcher, thereby improving processing performance.

In some examples, the prefetch circuitry is associated with a first level cache and the further prefetch circuitry is associated with a second level cache. This can be extended to additional cache levels. In other words, multiple levels of a multi-level cache hierarchy can share the same address translation circuitry.

Alternatively or additionally, the prefetch circuitry may be arranged to prefetch data on which the data processing operations can be performed, and the further prefetch circuitry may be arranged to prefetch instructions to cause the processing circuitry to perform the data processing operations. A data prefetcher and an instruction prefetcher can thus share the same address translation circuitry.

In some examples, the address translation circuitry is arranged to set a pre-heat flag to identify when a given item of address translation data stored therein has been obtained in anticipation of data being prefetched. It can thus be determined whether each item of address translation data was stored in the address translation circuitry by way of a pre-heating operation or by way of a non-pre-heating operation (for example a standard address translation request).

In some such examples, the address translation circuitry implements a replacement policy for the maintained address translation data. The replacement policy defines which item of translation data should be discarded from the translation circuitry in order to allow a new item of translation data to be stored. In one such example, the replacement policy is such that the address translation circuitry preferentially replaces address translation data for which the pre-heat flag is set. Address translation data that was stored by way of a pre-heating operation is thus preferentially replaced, relative to translation data that was stored by way of a non-pre-heating operation. This reduces the likelihood of replacing translation data that will actually be required, because pre-heated translation data is less likely to be required than translation data corresponding to data that has actually been prefetched (in part because its presence in the translation circuitry is generally a consequence of predicting a data access pattern further into the future).

Examples of the present disclosure will now be described with reference to the Figures.

FIG. 1 shows schematically an apparatus 100 according to an example of the present disclosure. The apparatus 100 can be implemented by general-purpose components, or by dedicated circuitry. For example, at least some of the components of the apparatus 100 may form part of a processing apparatus such as a central processing unit or graphics processing unit.

The apparatus 100 comprises processing circuitry 105 to perform data processing operations. For example, the processing circuitry 105 may implement a processing pipeline via which processing instructions are fetched, decoded, and executed. The instructions may for example define operations to perform on data.

The apparatus 100 comprises main memory 110. The main memory stores the aforementioned instructions and data. The main memory may for example be implemented in dynamic random access memory.

The apparatus 100 comprises a cache storage 115 with a lower access latency than the main memory 110. For example, the cache storage 115 may be implemented in static random access memory. The cache storage 115 temporarily stores a copy of a subset of the data that is stored in the main memory 110, such that accesses to the cached data by the processing circuitry 105 can be performed more quickly. The present example is described in terms of a data cache, but the system 100 could analogously implement an instruction cache to store instructions for execution by the processing circuitry 105.

The processing circuitry 105 references a given data item by way of a virtual memory address (VA). A given virtual address can be translated into a physical memory address (PA) in order to access the location in the main (physical) memory 110. To that end, the apparatus 100 comprises a translation lookaside buffer (TLB) 120 configured to receive requests specifying virtual addresses and to obtain address translation data used to translate them into corresponding physical addresses. The TLB 120 maintains address translation data obtained for recent requests such that, if a translation is requested in respect of a virtual address for which the address translation data is already stored in the TLB 120, the corresponding physical address can be promptly provided. However, if a translation is requested in respect of a virtual address that does not have the required address translation data not stored in the TLB 120, a page table walk 130 is performed with reference to one or more page tables 125 stored in the main memory 110. As explained above, performing a page table walk is significantly more time-consuming than providing a translation that is stored in the TLB 120.

The processing circuitry 105 requests data, from the cache 115, with a given virtual address. If that data is stored in the cache 115, it is provided to the processing circuitry 105. If the data is not stored in the cache 115, the cache 115 requests that data based on the physical address corresponding to the requested virtual address. In some examples, a single cache level is implemented and the request is issued directly from the cache 115 to the main memory. In other examples, the apparatus 100 comprises additional cache hierarchy levels 135 below the highest-level cache 115. These cache levels may for example be larger in size than the highest-level cache 115 but have higher access latencies. In such examples, the highest level cache 115 requests the data from the next-lowest cache level. If the data is stored in that cache level, it is returned to the highest-level cache 115 and thence to the processing circuitry 105. If that data is not stored in that cache level, a request is issued to the cache level below. This pattern is repeated as necessary, with the lowest cache level being configured to request the data from the main memory 110 if necessary.

The apparatus 100 comprises prefetch circuitry 140. The prefetch circuitry receives virtual addresses specified in requests issued to the cache 115 by the processing circuitry 105. The prefetch circuitry 140 then, based on a prediction scheme, predicts virtual addresses that are likely to be the subject of requests in the near future. For example, the prefetch circuitry 140 may detect that the processing circuitry 105 has made requests in relation to regularly-spaced virtual addresses, for example increasing by an increment of 8, and extrapolate this pattern based on an assumption that the pattern will continue. The prefetch circuitry 140 provides the predicted virtual addresses to the TLB 120 and receives the corresponding physical addresses. These physical addresses are then provided to the cache 115. If the predicted data is already stored in the cache, no further prefetch actions are performed. If the predicted data is not already stored in the cache, the cache 115 retrieves the predicted data in a similar manner as described above for requested data. Thus, if the prediction proves to be correct and the processing circuitry 105 does in fact request the predicted data, the predicted data can be provided to the processing circuitry 105 with a reduced latency compared with a comparative case in which the predicted data is not prefetched.

In addition to the above-described prefetching, the prefetch circuitry 140 uses the prediction scheme to predict further virtual addresses for data that is likely to be prefetched in the future. For example, the above-mentioned pattern of data access may be extrapolated further into the future. These further predicted addresses are provided to the TLB 120 such that, if the corresponding address translation data is not presently stored in the TLB 120, a corresponding page table walk can be performed to obtain the translation. This can be termed "preheating" of the TLB 120. If this further prediction proves correct and the data corresponding to the preheated address is subsequently prefetched, the relevant address translation data will already be stored in the TLB 120 and so the prefetching operation will not be delayed by performing a page table walk.

The prefetch circuitry 140 thus performs preheating and prefetching operations. The speed and efficiency of the prefetching is improved in such a system, relative to comparative systems in which no such preheating is performed. The risk of the processing flow of the processing circuitry 105 "catching up" which the prefetching is thereby reduced, and the corresponding slowing of data processing is averted.

Figure 2:
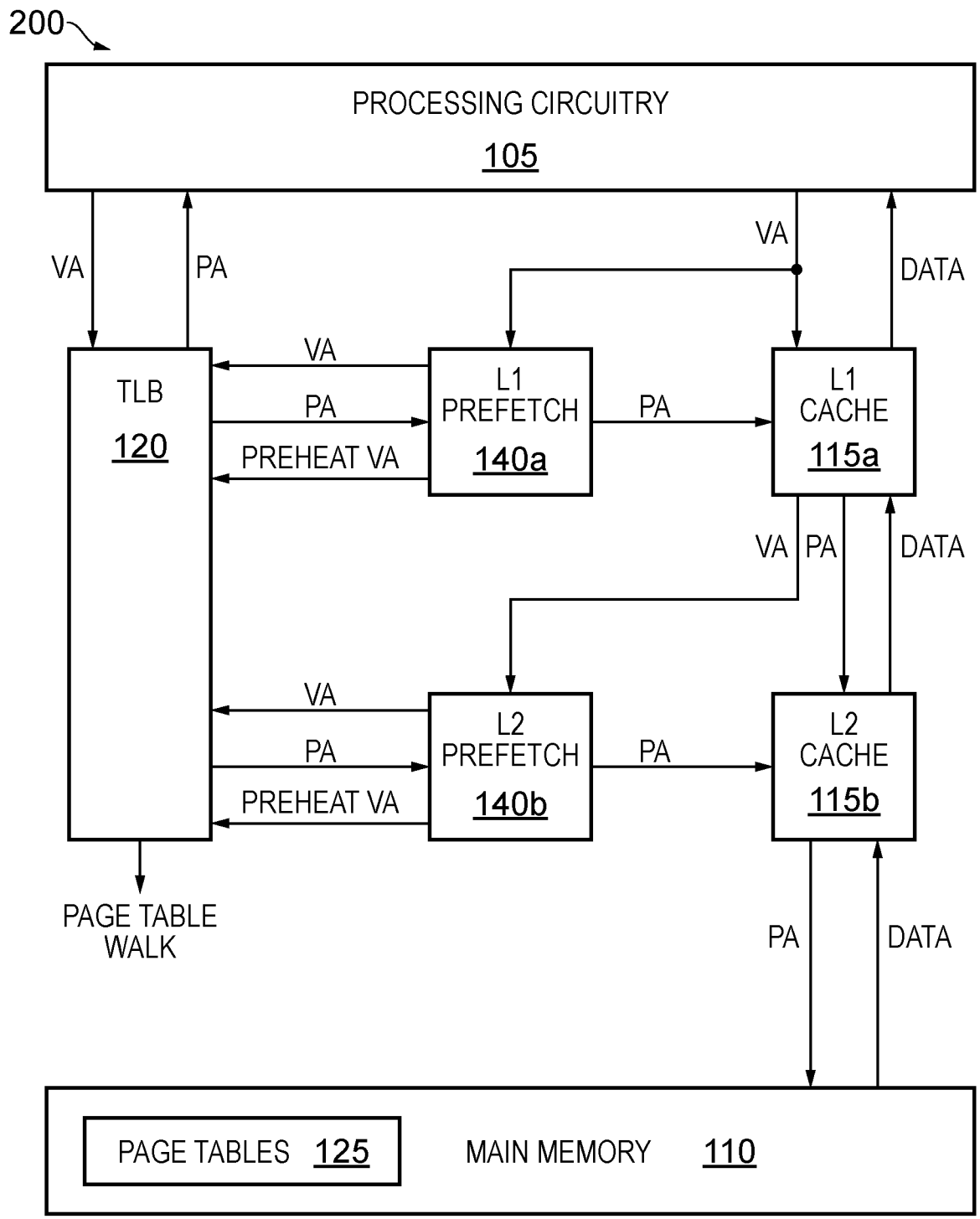
FIG. 2 shows schematically an apparatus according to another example of the present disclosure.

FIG. 2 shows schematically an apparatus 200 according to another example of the present disclosure. The apparatus 200 represents, in some ways, an extension of the apparatus 100.

The apparatus 200 comprises processing circuitry 105, main memory 110 storing one or more page tables 125, and a TLB 120, which operate in substantially the same fashion as the equivalent components of the apparatus 100.

The apparatus 200 comprises a first level (L1) cache 115a operating in conjunction with L1 prefetch circuitry 140a in substantially the same manner as described above in relation to the cache 115 and prefetch circuitry 140 of apparatus 100.

The apparatus 200 further comprises a second level (L2) cache 115b. As set out above in relation to the optional further caches 135 of apparatus 100, the L2 cache 115b is configured to receive requested physical addresses from the L1 cache 115a. If the corresponding data is stored in the L2 cache 115b, it is returned to the L1 cache 115a. If the corresponding data is not presently stored in the L2 cache 115b, it is retrieved from main memory 110 and then returned to the L1 cache 115a.

L2 prefetch circuitry 140b is associated with the L2 cache 115b. When the L1 cache 115a issues a request to the L2 cache 115b in respect of a physical address, it also provides the corresponding virtual address to the L2 prefetch circuitry 140b. The L2 prefetch circuitry uses a prediction scheme to predict virtual addresses corresponding to data that the L1 cache 115a is likely to request from the L2 cache 115b in the near future. This prediction scheme may operate in the same manner as the prediction scheme implemented by the L1 prefetch circuitry 140a. Alternatively or additionally, the L2 prefetch circuitry 140b may apply a different prediction scheme. The L2 prefetch circuitry provides the virtual addresses to the TLB 120 and receives corresponding physical addresses which are then provided to the L2 cache 115b for retrieval of the data, in an analogous manner to the operation of the L1 prefetch circuitry 140a and cache 115a.

In alternative examples, the L1 cache 115a provides the physical address to the L2 prefetch circuitry 140b and the L2 prefetch circuitry 140b applies a prediction scheme based on the physical address.

Similarly to the L1 prefetch circuitry 140a, the L2 prefetch circuitry 140b performs a preheating operation comprising predicting further virtual addresses that are likely to be prefetched in the near future, and providing those addresses to the TLB 120.

The same TLB 120 is thus shared by the L1 prefetch circuitry 140a and the L2 prefetch circuitry 140b. The TLB 120 can thereby take advantage of the prediction logic of both the L1 prefetch circuitry 140a and L2 prefetch circuitry 140b to perform the preheating, without requiring any complex prediction logic of its own. This can be extended to larger numbers of sources of address translation requests, for example further prefetch circuitry corresponding to further cache levels.

Figure 3:
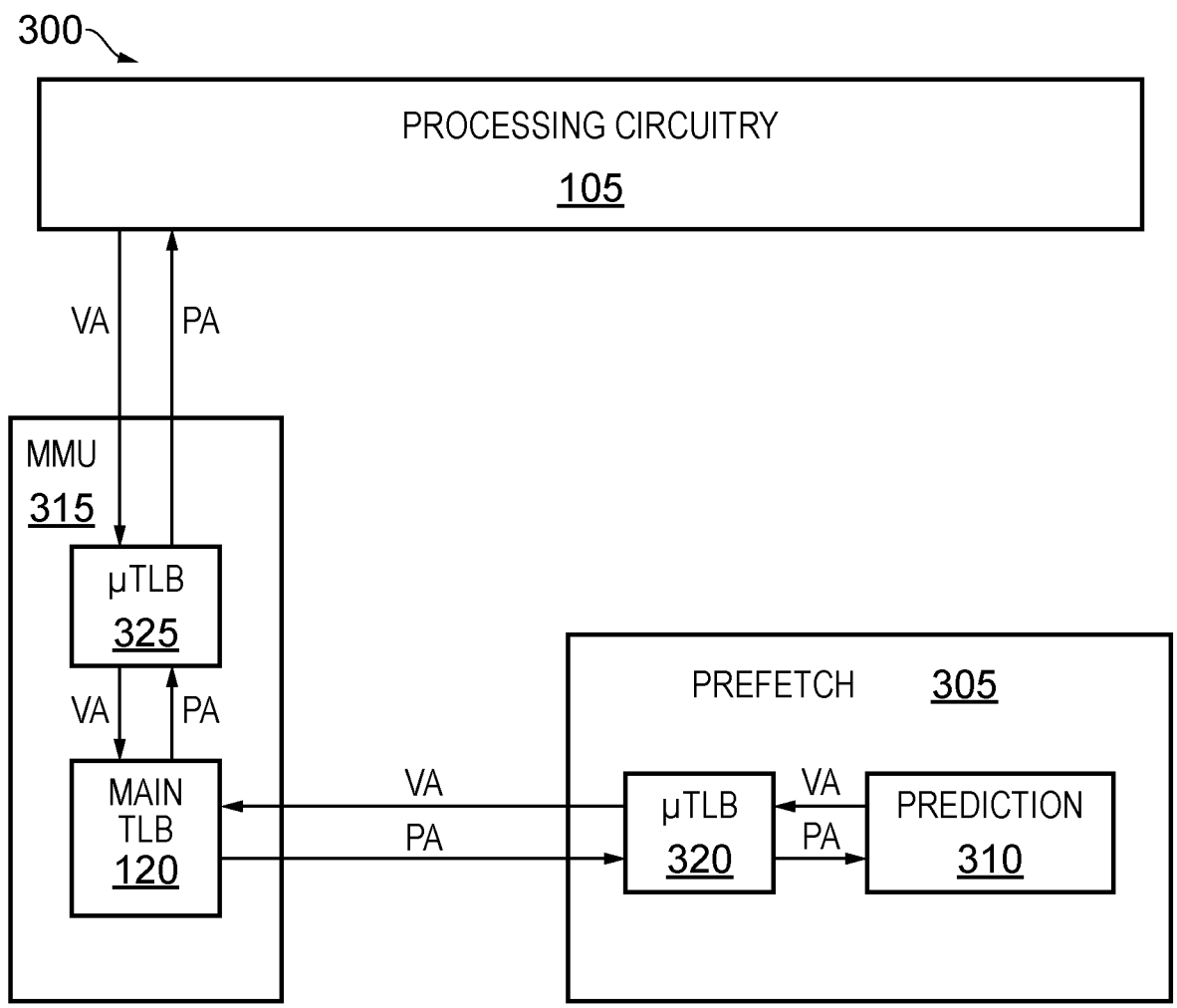
FIG. 3 shows schematically an arrangement that may be used in some examples of the present disclosure.

FIG. 3 shows schematically an apparatus 300 according to one example of the present disclosure. The apparatus 300 comprises processing circuitry 105 operating in the same manner as in apparatus 100 and 200 described above.

The apparatus 300 comprises prefetch circuitry 305. The prefetch circuitry 305 receives virtual addresses that the processing circuitry 105 requests from a cache (not shown), in a similar manner as in apparatus 100 and 200. The prefetch circuitry comprises prediction circuitry 310 to, based on the received virtual addresses, predict virtual addresses that are likely to be requested in the near future.

The apparatus 300 has a memory management unit (MMU) 315, which comprises the main TLB 120 of the apparatus 300.

The prefetch circuitry 310 comprises its own micro-TLB 320. This is dedicated to buffering recent virtual-to-physical address translations requested by the prediction circuitry 310 and, for this purpose, has a lower latency but also lower capacity than the main TLB 120. The prediction circuitry 310 issues translation requests to the micro-TLB 320. If the requested translation is presently stored by the micro-TLB 320, the corresponding physical address is returned to the prediction circuitry. If the requested translation is not presently stored by the micro-TLB 320, the request is passed on to the main TLB 120 which determines and returns the translation as described in more detail above. The latency for accessing virtual-to-physical address translations is thereby further reduced.

The MMU 315 similarly comprises its own micro-TLB 325 for receiving translation requests directly from the processing circuitry 105. This micro-TLB 325 satisfies translation requests in respect of translations that it presently stores, and passes other translation on to the main TLB 120.

The interrelation between the prefetching and preheating operations will now be described with reference to FIGS. 4 and 5.

Figure 4:
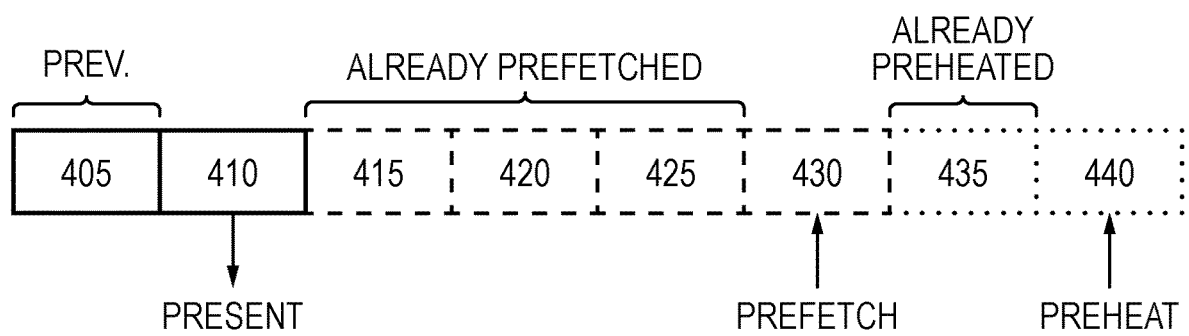
FIG. 4 shows schematically a series of memory locations identified by requests from processing circuitry.

FIG. 4 shows schematically a series of memory locations 405-440 at a given point in time, in the order in which they are requested by processing circuitry such as the circuitry 105. These may or may not be a regularly-spaced series of memory locations. As will be explained in more detail below, locations 405 and 410 (solid lines) correspond to requested addresses, locations 415-430 (dashed lines) correspond to prefetched addresses, and locations 435 and 440 (dotted lines) correspond to preheated addresses.

Memory location 405 was requested by the processing circuitry in the preceding processing operation.

Memory location 410 is requested by the processing circuitry in the present processing operation.

Memory locations 415-425 were prefetched by prefetching circuitry following data requests issued by the processing circuitry in previous processing operations.

Memory location 430 is prefetched by prefetching circuitry based on the presently requested location 410. For example, an upcoming request for memory location 430 may be predicted by extrapolating the pattern of data access leading to presently requested location 410 by four accesses into the future. In the present example, the prefetching can therefore be said to predict four processing operations into the future.

Memory location 435 was preheated by the prefetching circuitry following a data request issued by the processing circuitry in the previous processing operation.

Memory location 440 is preheated by the prefetching circuitry based on the presently requested location 410. For example, the aforementioned pattern of data access may be extrapolated two accesses further into the future. The preheating of the present example can therefore be said to predict two processing operations further into the future than the prefetching.

Figure 5:
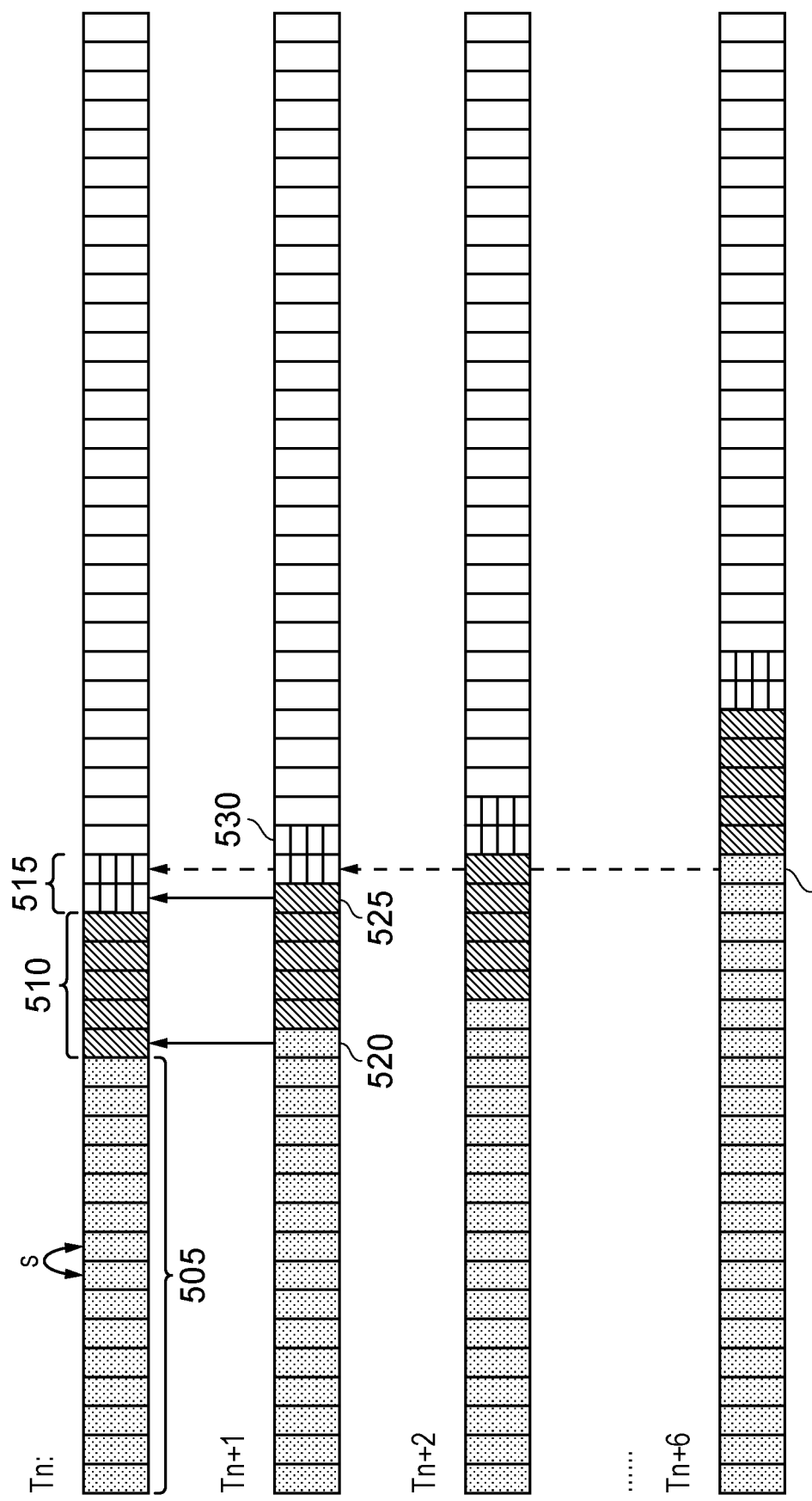
FIG. 5 shows schematically a series of memory locations at various times.

FIG. 5 shows schematically a series of memory locations at various times Tn, Tn+1 (i.e. one processing operation after Tn), Tn+2 and Tn+6.

Memory locations are requested by processing circuitry with a regular spacing of a stride length S. For example, if the processing circuitry requests every $8^{th}$ memory address, the stride length S=8.

Memory locations corresponding to requests from the processing circuitry are dotted. Memory locations corresponding to prefetch requests are diagonally hatched. Memory locations corresponding to preheat requests are horizontally hatched.

At time Tn, memory locations 505 correspond to requests from the processing circuitry. Memory locations 510 correspond to prefetch requests. There are five such memory locations, meaning that the prefetch circuitry is operating five processing operations into the future such that the prefetch circuitry prefetches the address five operations ahead of the address that is presently requested by the processing circuitry. This may be termed the prefetch distance. Memory locations 515 correspond to preheat requests. There are two such memory locations, meaning that the preheat circuitry preheats the address two processing operations ahead of the presently prefetched address. The preheat distance can thus be said to be 5+2=7.

At time Tn+1, the processing flow has moved ahead by one address. Memory address 520, which was previously a prefetched address, has been requested by the processing circuitry. Similarly, memory address 525, which was previously preheated, has been prefetched. Memory address 530 has been preheated.

This progression continues, assuming that the processing circuitry maintains the same pattern of data access. At time Tn+6, the processing circuitry requests memory address 535. This address was preheated at time Tn and prefetched at time Tn+2. The speed of prefetching is improved by virtue of the preheating. The speed of providing the data to the processing circuitry when requested is similarly improved by virtue of the prefetching.

Figure 6:
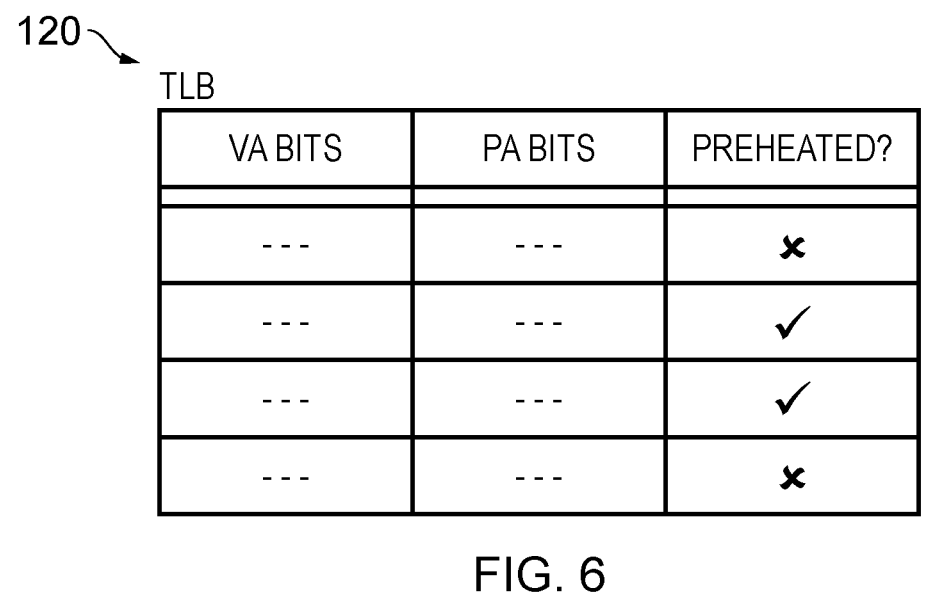

FIG. 6 shows an example of entries in a TLB 120. The layout is schematic for ease of illustration, and may be different in actuality. For each entry, bits of a virtual address (VA) are stored against bits of the corresponding physical address (PA). The stored bits may be the complete addresses, or portions thereof.

For each entry, a "PREHEATED?" flag is stored. The flag is set when a given entry is added to the table as part of a preheating operation. The flag is then unset when a prefetch request is received in respect of a virtual address which maps to that given entry, and hence for which the corresponding physical address can be determined using the address translation data in that entry. The TLB 120 can be managed based on this flag. For example, when determining which entry to remove from the TLB 120 to make space for a new entry, the TLB 120 may preferentially remove an entry for which the flag is set. This reduces the chance of removing entries that are likely to be required sooner, because entries which have been preheated but not prefetched correspond to predictions further into the future than entries which have been prefetched.

Figure 7:
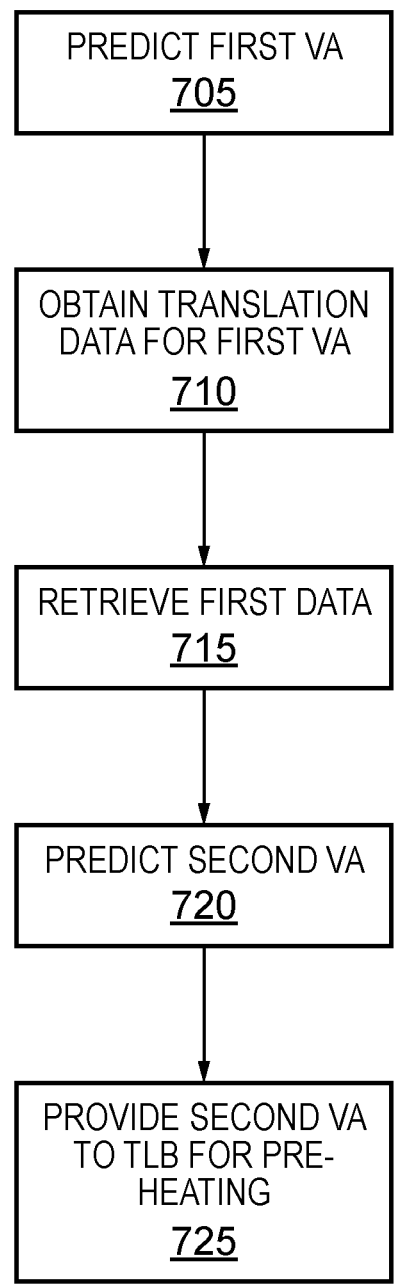
FIG. 7 shows schematically a method according to examples of the present disclosure.

FIG. 7 shows schematically a method 700 according to examples of the present disclosure. The method 700 may for example be implemented by the prefetch circuitry that is described above.

At block 705, a first virtual address is predicted, for example based on extrapolating a pattern of data access by processing circuitry.

At block 710, translation data (such as a physical address, or data based on which a physical address can be determined) is obtained for the first virtual address.

At block 715, the data corresponding to the first virtual address is retrieved, for example with reference to the physical address corresponding to the first virtual address.

At block 720, a second virtual address is predicted, for example by extrapolating the pattern of data access further into the future than for the first virtual address.

At block 725, the second virtual address is provided to a TLB for preheating, whereby translation data for the second virtual address is stored in the TLB.

Whilst the blocks are shown in order in FIG. 7, implementations of the method may change the order or perform some steps in parallel. For example, blocks 720 and 725 may be performed before, or in parallel with, any of blocks 705-715.

Through use of the above described techniques, it will be appreciated that the speed and efficiency of prefetching can be improved by implementation of preheating of a TLB.

Methods described herein may be performed in hardware and/or software. Such hardware may be a general-purpose processor, or a more specific unit such as an application-specific integrated circuit or a field-programmable gate array.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative examples of the invention have been described in detail herein with reference to the accompanying drawings, it is to be understood that the invention is not limited to those precise examples, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to perform data processing operations;
storage circuitry to store data for access by the processing circuitry;
address translation circuitry to maintain address translation data for translating virtual memory addresses into corresponding physical memory addresses; and
prefetch circuitry to:
prefetch first data into the storage circuitry in anticipation of the first data being required for performing the data processing operations, wherein the prefetching comprises:
based on a prediction scheme, predicting a first virtual memory address associated with the first data;
accessing the address translation circuitry to determine a first physical memory address corresponding to the first virtual memory address; and
retrieving the first data based on the first physical memory address corresponding to the first virtual memory address,
based on the prediction scheme, predict a second virtual memory address associated with second data; and
provide the predicted second virtual memory address to the address translation circuitry to pre-heat the address translation circuitry with the address translation data for the second virtual memory address, in anticipation of a potential subsequent prefetching of the second data.

2. An apparatus according to claim 1, wherein the prediction scheme comprises extrapolation of a prior pattern of data access by the processing circuitry.

3. An apparatus according to claim 2, wherein predicting the second virtual memory address comprises extrapolating the prior pattern of data access further than the predicting of the first virtual memory address.

4. An apparatus according to claim 3, wherein:
the predicting of the first virtual memory address comprises extrapolating the prior pattern of data access by a first number of data processing operations ahead of a current data processing operation; and
the predicting of the second virtual memory address comprises extrapolating the prior pattern of data access by a second number of data processing operations ahead of the current data processing operation, the second number being higher than the first number.

5. An apparatus according to claim 1, wherein the prefetch circuitry is arranged to provide the predicted second virtual memory address to the address translation circuitry responsive to a determination that the second virtual memory address is within a preheat distance of the end of a memory page.

6. An apparatus according to claim 1, comprising additional translation request source circuitry to reference the address translation circuitry to determine physical memory addresses for virtual memory addresses.

7. An apparatus according to claim 6, wherein the additional translation request source circuitry comprises further prefetch circuitry associated with further storage circuitry.

8. An apparatus according to claim 7, wherein:
the prefetch circuitry is associated with a first level cache; and
the further prefetch circuitry is associated with a second level cache.

9. An apparatus according to claim 7, wherein:
the prefetch circuitry is arranged to prefetch data on which the data processing operations can be performed; and
the further prefetch circuitry is arranged to prefetch instructions to cause the processing circuitry to perform the data processing operations.

10. An apparatus according to claim 1, wherein the address translation circuitry is arranged to set a pre-heat flag to identify when a given item of address translation data stored therein has been obtained in anticipation of data being prefetched.

11. An apparatus according to claim 10, wherein:
the address translation circuitry implements a replacement policy for the maintained address translation data; and
the replacement policy is such that the address translation circuitry preferentially replaces address translation data for which the pre-heat flag is set.

12. An apparatus according to claim 1, wherein the storage circuitry is a cache storage associated with the processing circuitry.

13. An apparatus according to claim 1, wherein each of the first data and second data is a data item on which the data processing operations can be performed.

14. An apparatus according to claim 1, wherein each of the first data and second data is an instruction to cause the processing circuitry to perform at least one of the data processing operations.

15. An apparatus according to claim 1, wherein:
the address translation circuitry comprises a buffer storage to store the address translation data for a subset of virtual addresses; and
when translation data is requested for a given virtual address, and the translation data for the given virtual address is stored in the buffer storage, the address translation circuitry is arranged to retrieve the address translation data for the given virtual address from the buffer storage.

16. An apparatus according to claim 15 wherein when translation data is requested for a given virtual address, and the translation data for the given virtual address is not stored in the buffer storage, the address translation circuitry is arranged to initiate a page table walk process to obtain the translation data for storing in the buffer storage.

17. An apparatus according to claim 1, wherein the address translation circuitry implements a translation lookaside buffer.

18. A method comprising:
   prefetching first data into a storage in anticipation of the first data being required for performing data processing operations, wherein the prefetching comprises:
      based on a prediction scheme, predicting a first virtual memory address associated with the first data;
      obtaining from address translation circuitry address translation data for the first virtual memory address, the address translation data defining a translation from the first virtual memory address to a physical memory address; and
      retrieving the first data based on the physical memory address,
   based on the prediction scheme, predicting a second virtual memory address associated with second data; and
   providing the predicted second virtual memory address to the address translation circuitry to pre-heat the address translation circuitry with address translation data for the second virtual memory address, in anticipation of a potential subsequent prefetching of the second data.

19. An apparatus comprising:
   processing means to perform data processing operations;
   storage means to store data for access by the processing means;
   address translation means to maintain address translation data for translating virtual memory addresses into corresponding physical memory addresses; and
   prefetch means to:
      prefetch first data into the storage means in anticipation of the first data being required for performing the data processing operations, wherein the prefetching comprises:
         based on a prediction scheme, predicting a first virtual memory address associated with the first data;
         obtaining from the address translation means the address translation data for the first virtual memory address; and
         retrieving the first data based on the physical memory address corresponding to the first virtual memory address,
      based on the prediction scheme, predict a second virtual memory address associated with second data; and
      provide the predicted second virtual memory address to the address translation means to pre-heat the address translation circuitry with the address translation data for the second virtual memory address, in anticipation of a potential subsequent prefetching of the second data.

* * * * *